US012782775B2

(12) United States Patent
Shiau et al.

(10) Patent No.: US 12,782,775 B2
(45) Date of Patent: Nov. 3, 2026

(54) FRONT LIGHT MODULE AND DISPLAY DEVICE

(71) Applicant: Coretronic Corporation, Hsin-Chu (TW)

(72) Inventors: Tzeng-Ke Shiau, Hsin-Chu (TW); Ying-Shun Syu, Hsin-Chu (TW); Chin-Yuan Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 179 days.

(21) Appl. No.: 18/935,711

(22) Filed: Nov. 4, 2024

(65) Prior Publication Data

US 2025/0147361 A1 May 8, 2025

(30) Foreign Application Priority Data

Nov. 7, 2023 (CN) ......................... 202311468599.7

(51) Int. Cl.
*G02F 1/1335* (2006.01)
*F21V 8/00* (2006.01)
(Continued)

(52) U.S. Cl.
CPC ....... *G02F 1/133616* (2021.01); *G02B 5/305* (2013.01); *G02B 6/0036* (2013.01); *G02B 6/005* (2013.01); *G02B 6/0056* (2013.01); *G02B 6/0065* (2013.01); *G02B 6/0088* (2013.01); *G02F 1/133615* (2013.01); *G02F 2201/38* (2013.01)

(58) Field of Classification Search
CPC ......... G02F 1/133616; G02F 1/133615; G02F 2201/38; G02B 5/305; G02B 6/0036; G02B 6/005; G02B 6/0056; G02B 6/0065; G02B 6/0088
See application file for complete search history.

(56) References Cited

U.S. PATENT DOCUMENTS 11,808,964 B1 * 11/2023 Shen .................... G02B 6/0036
2012/0281430 A1 * 11/2012 Huang ................. G02B 6/0061 362/603

(Continued)

FOREIGN PATENT DOCUMENTS

CN 218447098 U 2/2023
TW I811076 B 8/2023

*Primary Examiner* — Kevin Quarterman

(57) ABSTRACT

A front light module provided includes a light-emitting element, a light guide plate, and a film assembly. The light guide plate has a light-incident surface and a light-exiting surface. The light-incident surface is connected to the light-exiting surface and is disposed opposite to the light-emitting element. The light-exiting surface has a plurality of micro-structures. The film assembly includes a first light-penetrating adhesive layer, an optical film, and a second light-penetrating adhesive layer. The first light-penetrating adhesive layer is connected to the light-exiting surface. The optical film is disposed between the first light-penetrating adhesive layer and the second light-penetrating adhesive layer, and the first light-penetrating adhesive layer is disposed between the light guide plate and the optical film. A display device having the front light module is also provided. The front light module and the display device can improve the visibility.

10 Claims, 5 Drawing Sheets

(51) Int. Cl.

| | |
|---|---|
| ***G02B 5/30*** | (2006.01) |
| *G02F 1/13357* | (2006.01) |

(56) References Cited

U.S. PATENT DOCUMENTS

| | | | | |
|---|---|---|---|---|
| 2017/0307805 | A1* | 10/2017 | Wong .................... | G02B 6/0088 |
| 2019/0339440 | A1* | 11/2019 | Bookbinder ......... | G02B 6/0051 |
| 2022/0099882 | A1* | 3/2022 | Wen ...................... | G02B 6/0055 |
| 2025/0138368 | A1* | 5/2025 | Luo ....................... | G02B 6/0031 |

* cited by examiner

FRONT LIGHT MODULE AND DISPLAY DEVICE

CROSS-REFERENCE TO RELATED APPLICATION

This application claims the priority benefit of China application No. 202311468599.7, filed on Nov. 7, 2023. The entirety of the above-mentioned patent application is hereby incorporated by reference herein and made a part of this specification.

TECHNICAL FIELD

The disclosure relates to a light source module, and more particularly to a front light module and a display device having the front light module.

BACKGROUND

A reflective display device use ambient light as a light source to form display light which is transmitted to the eyes of a user. In an occasion where ambient light is insufficient, a front light module in front of the reflective panel can be turned on to supplement light intensity. Because reflective display devices mostly use ambient light as the light source, so that the reflective display devices have the advantages of less burden to human eyes, small thickness, power saving, and the like.

However, because the upper surface of a light guide plate of a common front light module is provided with optical microstructures, the light guide plate and a functional film (for example, a transparent cover plate, a touch film, an anti-dazzle film, or an anti-reflection sheet) arranged on one side of the upper surface of the light guide plate can be adhered only using air bonding, so that a situation that an adhesive layer fills the optical microstructures on the upper surface of the light guide plate to damage the optical performance of the light guide plate is avoided. However, in such a design, after the ambient light is incident into the reflective display device, it will be reflected on the upper surface (that is, an interface between the light guide plate and air) of the light guide plate, and cannot be smoothly transmitted to the reflective display panel, so that the intensity of the display light is reduced. Furthermore, the light reflected by the interface will cause visual interference to the user. Therefore, there may be a problem of poor visibility to adhere an optical assembly or an optical film of the reflective display device by means of air bonding.

The information disclosed in this "BACKGROUND" section is only for enhancement understanding of the background and therefore it may contain information that does not form the prior art that is already known to a person of ordinary skill in the art. Furthermore, the information disclosed in this "BACKGROUND" section does not mean that one or more problems to be solved by one or more embodiments of the disclosure were acknowledged by a person of ordinary skill in the art.

SUMMARY

In order to achieve one or a portion of or all of the objectives or other objectives, the front light module in an embodiment of the disclosure includes a light-emitting element, a light guide plate, and a film assembly. The light guide plate has a light-incident surface and a light-exiting surface. The light-incident surface is connected to the light-exiting surface and is disposed opposite to the light-emitting element, and the light-exiting surface has a plurality of microstructures. The film assembly includes a first light-penetrating adhesive layer, an optical film, and a second light-penetrating adhesive layer. The first light-penetrating adhesive layer is connected to the light-exiting surface. The optical film is disposed between the first light-penetrating adhesive layer and the second light-penetrating adhesive layer, and the first light-penetrating adhesive layer is disposed between the light guide plate and the optical film. A first thickness of the first light-penetrating adhesive layer is less than a second thickness of the second light-penetrating adhesive layer.

In order to achieve one or a portion of or all of the objectives or other objectives, the display device in an embodiment of the disclosure includes the aforementioned front light module and a reflective display panel. The reflective display panel is disposed on a side, opposite to the film assembly, of the light guide plate.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

The disclosure provides a front light module and a display device can improve the visibility.

Figure 1:
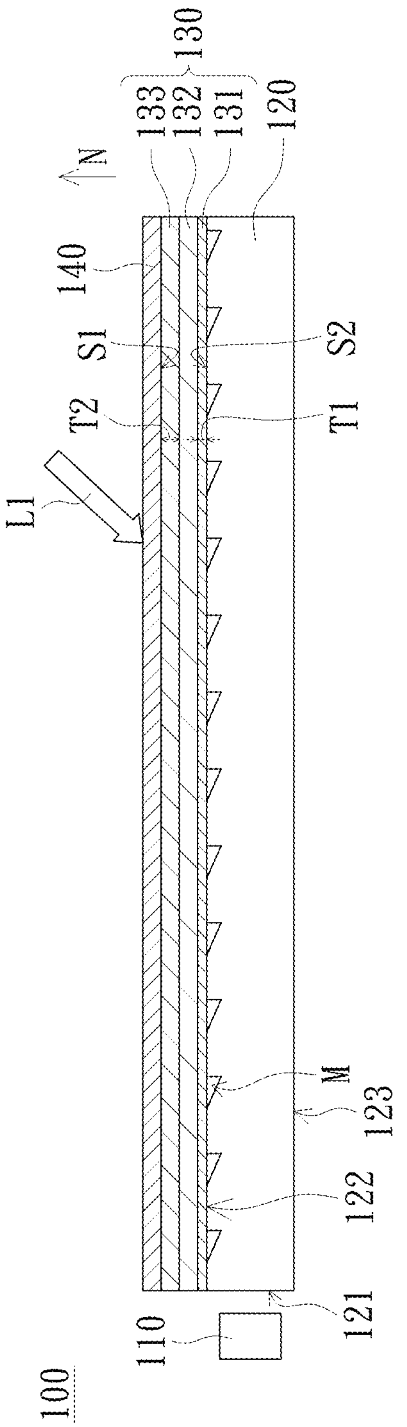
FIG. 1 is a schematic cross-sectional diagram of a front light module in an embodiment of the disclosure.

FIG. 1 is a schematic cross-sectional diagram of a front light module in an embodiment of the disclosure. Referring to FIG. 1, a front light module 100 includes a light-emitting element 110, a light guide plate 120, and a film assembly 130. The light guide plate 120 has a light-incident surface 121 and a light-exiting surface 122. The light-incident surface 121 is connected to the light-exiting surface 122 and is disposed opposite to the light-emitting element 110, and the light-exiting surface 122 has a plurality of microstructures M. The film assembly 130 includes a first light-penetrating adhesive layer 131, an optical film 132, and a second light-penetrating adhesive layer 133. The first light-penetrating adhesive layer 131 is connected to the light-exiting surface 122. The optical film 132 is disposed between the first light-penetrating adhesive layer 131 and the second light-penetrating adhesive layer 133, and the first light-penetrating adhesive layer 131 is disposed between the light guide plate 120 and the optical film 132. The first thickness T1 of the first light-penetrating adhesive layer 131 is less than the second thickness T2 of the second light-penetrating adhesive layer 133. It is to be noted that the first thickness T1 is, for example, the thickness of the first light-penetrating adhesive layer 131 in the normal N parallel to the light-exiting surface 122 (e.g., a distance between the light-exiting surface 122 and the optical film 132), and the second thickness T2 can be the thickness of the second light-penetrating adhesive layer 133 parallel to the normal N.

The film assembly 130 is located on the side of the front light module 100 for ambient light L1 to be incident on. In detail, the front light module 100 further includes, for example, a cover plate 140, and the film assembly 130 can be disposed between the cover plate 140 and the light guide plate 120. The ambient light L1 can enter the front light module 100 from the cover plate 140. Further, the second light-penetrating adhesive layer 133 can be disposed in a gap between the cover plate 140 and the optical film 132 to reduce the interfacial reflection formed when the ambient light L1 passes through the cover plate 140 and the second light-penetrating adhesive layer 133. In the embodiment, the cover plate 140 can be a light-transmitting cover plate, and the material of the cover plate 140 can include glass or plastic. In an embodiment, a touch layer (or a touch panel) can be disposed on the side, facing the film assembly 130, of the cover plate 140. Because the second light-penetrating adhesive layer 133 fills the gap between the cover plate 140 and the optical film 132, the touch feel (e.g., touch feedback) of the front light module 100 can further be improved. In other embodiments, the cover plate 140 may have functions such as anti-glare or anti-reflection. The second light-penetrating adhesive layer 133 and the first light-penetrating adhesive layer 131 in the embodiment may include an optical clear adhesive (OCA), but the disclosure is not limited thereto.

In the embodiment, the material hardness of the optical film 132 can be greater than the material hardness of the first light-penetrating adhesive layer 131 and the second light-penetrating adhesive layer 133. For example, the material of the optical film 132 may include polyethylene terephthalate (PET), triacetate cellulose (TC), polycarbonate (PC), or polymethyl methacrylate (PMMA), but the disclosure is not limited thereto. In the embodiment, the optical film 132 is, for example, a transparent plastic sheet (transmittance is, for example, higher than 90%) to provide support to the first light-penetrating adhesive layer 131 and the second light-penetrating adhesive layer 133. In other embodiments, the optical film 132 can be an optical functional film, such as a polarizer.

Figure 2:
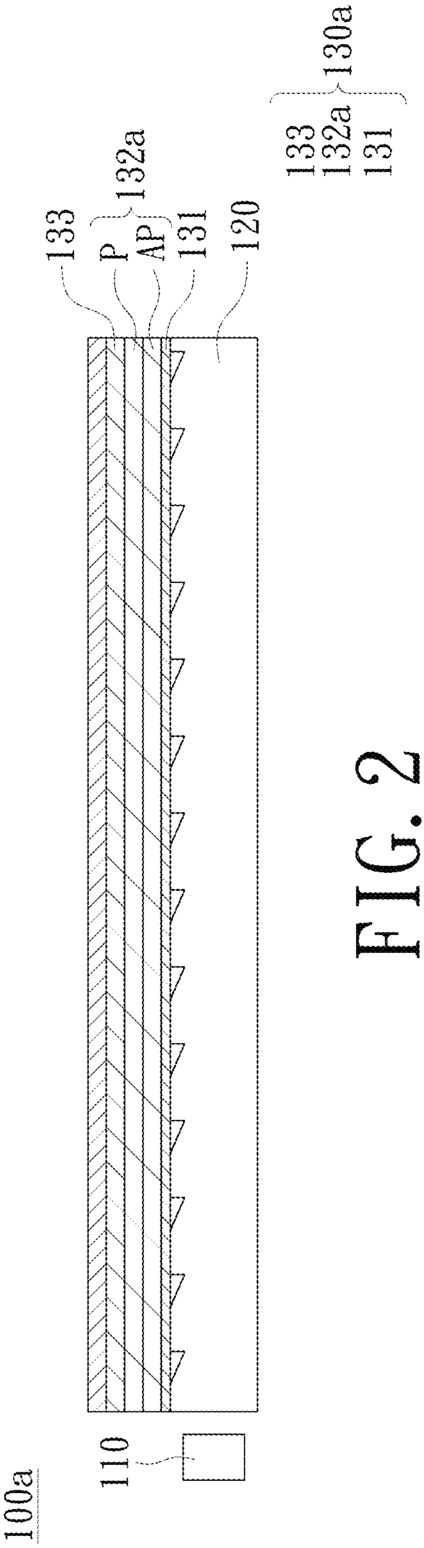
FIG. 2 is a schematic cross-sectional diagram of a front light module according to another embodiment of the disclosure.

In an embodiment, such as in the front light module 100*a* shown in FIG. 2, the optical film 132*a* can include a polarizer P and an advanced polarization conversion film (APCF) AP. The advanced polarization conversion film AP is disposed between the first light-penetrating adhesive layer 131 and the polarizer P to increase the contrast ratio of image displayed by a display device includes the front light module 100*a*. Further, the second light-penetrating adhesive layer 133 of the film assembly 130*a* can be disposed on a side, opposite to the light guide plate 120, of the advanced polarization conversion film AP, and the polarizer P can be sandwiched between the advanced polarization conversion film AP and the second light-penetrating adhesive layer 133. The transmission axis of the polarizer P is, for example, parallel to the transmission axis of the advanced polarization conversion film AP. The polarization angle between the light beam passing through the advanced polarization conversion film AP and the polarizer P can be less than 20°, but the disclosure does not over-limit these details.

Referring to FIG. 1 again, the film assembly 130 in the embodiment has an upper surface S1 and a lower surface S2. The upper surface S1 and the lower surface S2 are, for example, planes. The optical film 132 is, for example, flat. The surfaces on both sides of the optical film 132 are planes, that is, there is no microstructure disposed thereon. Specifically, the upper surface S1 can be connected to the cover plate 140, and the lower surface S2 is connected to the light-exiting surface 122. The upper surface S1 and the lower surface S2 do not have optical structures with dimensions close to the microstructure M. In addition, the upper surface S1 and the lower surface S2 can be parallel to the light-exiting surface 122, respectively. In an embodiment, there can be included angles less than 5° between the upper surface S1 and the light-exiting surface 122 and between the lower surface S2 and the light-exiting surface, respectively.

Figure 3:
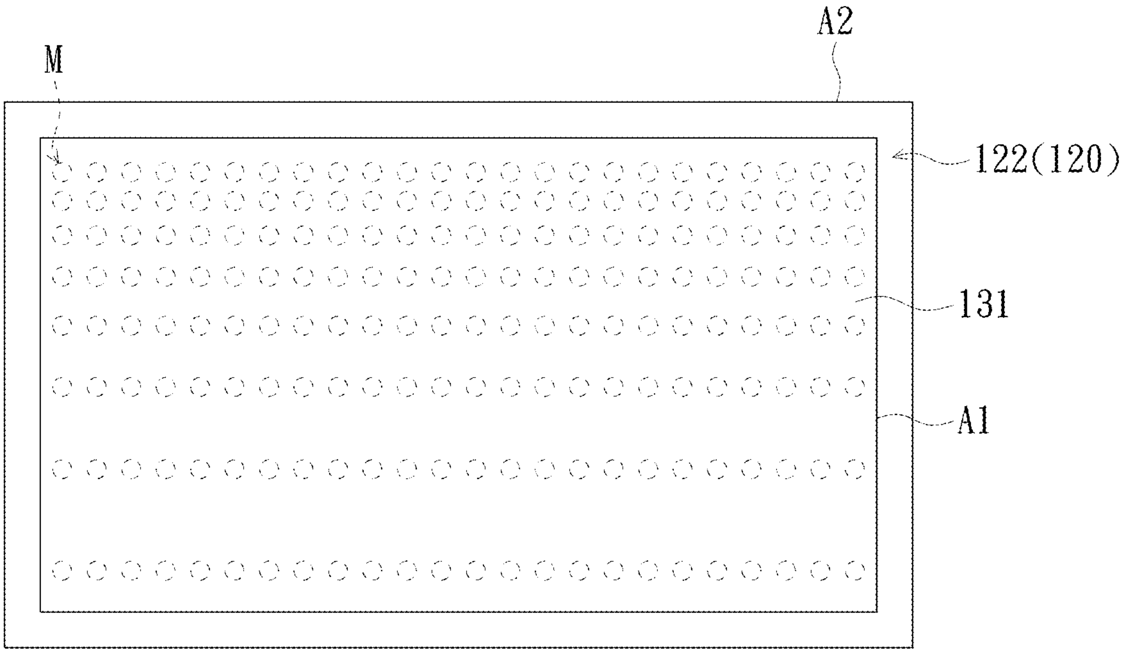
FIG. 3 is a schematic top view of a first light-penetrating adhesive layer disposed on a light-exiting surface according to another embodiment of the disclosure.

In the embodiment, the first light-penetrating adhesive layer 131 can be attached to the light-exiting surface 122 and the optical film 132 so the optical film 132 is fixed to the light-exiting surface 122, thereby reducing the interfacial reflection formed when the ambient light L1 passes through the optical film 132 and the light-exiting surface 122. Further, referring to FIG. 3, in an embodiment, the ratio of the projection area A1 of the first light-penetrating adhesive layer 131 on the light-exiting surface 122 to the area A2 of the light-exiting surface 122 can be greater than 0.8. In detail, the first light-penetrating adhesive layer 131 can be disposed on the light-exiting surface 122 by way of direct bonding instead of by way of air bonding. In other words, the first light-penetrating adhesive layer 131 can cover the light-exiting surface 122 and is not disposed along the edge of the light-exiting surface 122. Therefore, the first light-penetrating adhesive layer 131 can fill the gap between the light-exiting surface 122 and the optical film 132 more completely to reduce the interfacial reflection formed by the ambient light L1 (shown in FIG. 1). Referring to FIG. 1 and FIG. 3 again, the first light-penetrating adhesive layer 131 covers, for example, the area of the light-exiting surface 122 with the microstructures M.

Further, the adhesive force of the first light-penetrating adhesive layer 131 can be less than the adhesive force of the second light-penetrating adhesive layer 133, and the first thickness T1 of the first light-penetrating adhesive layer 131 is, for example, less than 50 μm. In detail, because the microstructures M of the light guide plate 120 are recessed in the light-exiting surface 122, the first light-penetrating adhesive layer 131 can have a relatively small adhesive force and a relatively small thickness to reduce the amount of the first light-penetrating adhesive layer 131 recessed in the microstructures M, thereby improving the optical feature of the front light module 100. In an embodiment, the adhesive force of the first light-penetrating adhesive layer 131 can be approximately less than or equal to 50-500 mN/25 mm. In another embodiment, the range of the first thickness T1 is, for example, approximately less than or equal to 20-50 um, but the disclosure is not limited thereto. In an embodiment, the material hardness of the first light-penetrating adhesive layer 131 can be greater than the material hardness of the second light-penetrating adhesive layer 133 to prevent the excessive first light-penetrating adhesive layer 131 from being recessed in the microstructures M. Other characteristics of the first light-penetrating adhesive layer 131 are similar to those of the second light-penetrating adhesive layer 133, and no redundant detail is to be given herein.

Referring to FIG. 1, the light beam generated by the light-emitting element 110 enters the light guide plate 120 from the light-incident surface 121. The light beam is reflected by the microstructures M, transmitted to the surface 123 of the light guide plate 120, and then emitted. The surface 123 is, for example, connected to the light-incident surface 121 and is opposite to the light-exiting surface 122. The light beam emitted from the surface 123 is then reflected by the reflective display panel (shown in FIG. 8) and is transmitted to the light guide plate 120 via the surface 123, leaves the light guide plate 120 from the light-exiting surface 122, and is transmitted to the film assembly 130, so that the light beam leaves the front light module 100 via the film assembly 130. Further, the light-emitting element 110 can provide the light beam in a case where the ambient light L1 is insufficient. The characteristics of the aforementioned reflective display panel will be described in subsequent paragraphs. The light-emitting element 110 includes, for example, a light-emitting diode, but the disclosure is not limited thereto.

The light guide plate 120 can guide the light beam generated by the light-emitting element 110 to be transmitted in the light guide plate 120 and allow the ambient light L1 to pass through and then is incident to the reflective display panel. In the embodiment, the material of the light guide plate 120 can include polymethyl methacrylate (PMMA); however, the material of the light guide plate 120 can include cyclo olefin polymer (COP) or polycarbonate (PC) in other embodiments. In addition, the light guide plate 120 in the embodiment can be formed by way of hot press molding or injection molding, which is not limited in the disclosure.

Compared with the prior art, the front light module 100 in the embodiment uses the light guide plate 120 and the film assembly 130, wherein the film assembly 130 uses the first light-penetrating adhesive layer 131 and the second light-penetrating adhesive layer 133 to sandwich the optical film 132. Further, the first light-penetrating adhesive layer 131 can fill the gap between the light guide plate 120 and the optical film 132 to reduce the interfacial reflection formed when the ambient light L1 passes through the optical film 132 and the light-exiting surface 122. In addition, the second light-penetrating adhesive layer 133 can be disposed on the side, opposite to the light-exiting surface 122, of the optical film 132 to fill the gaps between the optical film 132 and other optical elements (for example, the cover plate 140) so as to further reduce the interfacial reflection formed when the ambient light L1 passes through the second light-penetrating adhesive layer 133 and the optical film 132. Based on the above, the front light module 100 in the embodiment can reduce the reflected light at the interface and can prevent the optical effect generated by the microstructures M from being damaged.

Figure 4:
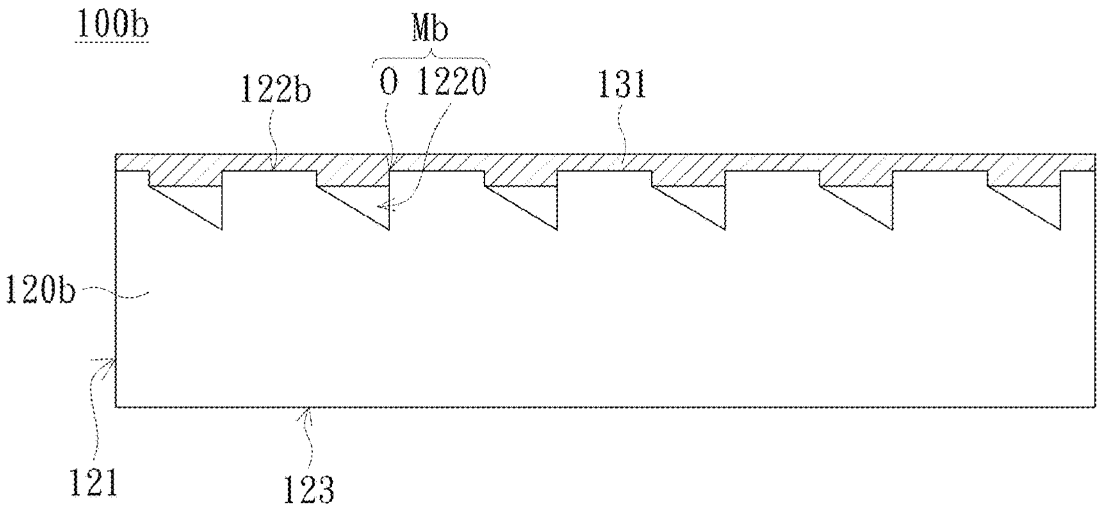
FIG. 4 is a schematic top view of a first light-penetrating adhesive layer of a front light module disposed on a light-exiting surface in another embodiment of the disclosure.
Figure 5:
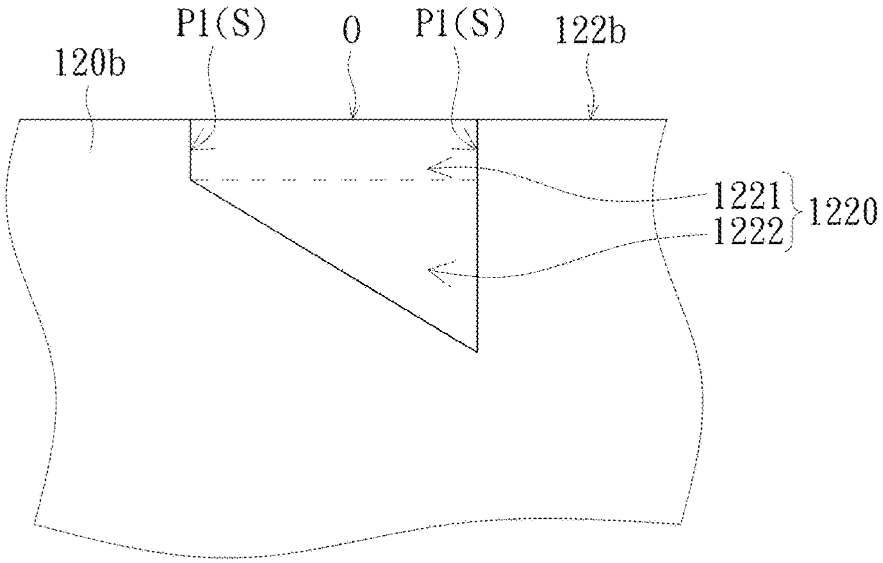
FIG. 5 is an enlarged schematic diagram of a microstructure in FIG. 4.

FIG. 4 is a schematic top view of a first light-penetrating adhesive layer of a front light module disposed on a light-exiting surface in another embodiment of the disclosure. FIG. 5 is an enlarged schematic diagram of a microstructure in FIG. 4. The structure and advantages of the front light module **100*b* in the embodiment are similar to those in the embodiment shown in FIG. 1, and only the differences will be described below. Referring to FIG. 4 and FIG. 5, each of the microstructures Mb of the light guide plate 120 has an opening O and a recessed portion 1220. The opening O is located on the light-exiting surface 122*b*, and the recessed portion 1220 is recessed in the light-exiting surface 122*b* and is communicated to the opening O. The recessed portion 1220 has an adhesive-filling section 1221 and a gap section 1222 (both are shown in FIG. 5) communicated to each other. The adhesive-filling section 1221 is located between the opening O and the gap section 1222, and at least a part of the first light-penetrating adhesive layer 131 is disposed in the adhesive-filling section 1221. In detail, the gap section 1222 can reflect the light beam entered from the light-incident surface 121 (shown in FIG. 4) to the surface 123, and the adhesive-filling section 1221 can accommodate the part of the first light-penetrating adhesive layer 131, thereby reducing the entry of the first light-penetrating adhesive layer 131 into the gap section 1222. Therefore, the adhesive-filling section 1221 can prevent excessive first light-penetrating adhesive layer 131 from being cured in the gap section 1222 during the adhesive-filling and curing processes, thereby improving the light reflectivity of the gap section 1222. In an embodiment, the depth of the first light-penetrating adhesive layer 131 recessed in the recessed portion 1220 can be approximately less than or equal to 10 um, which is not limited in the disclosure. It can be understood that in the embodiment, the first light-penetrating adhesive layer 131 is illustrated by filling up the adhesive-filling section 1221**, but the disclosure is not limited thereto.

Further, the adhesive-filling section 1221 in the embodiment has a peripheral surface S (shown in FIG. 5). The peripheral surface S is adjacent to the light-exiting surface 122*b* and may have a perpendicular portion P1. The perpendicular portion P1 is substantially perpendicular to the light-exiting surface 122*b*, and the perpendicular portion P1 encircles the opening O, that is, the projection of the perpendicular portion P1 on the light-exiting surface 122*b* is a closed curve. Thus, the adhesive-filling section 1221 can be more easily processed and formed. In other embodiments, the perpendicular portion P1 may only partially encircle the opening O, the ratio of the part of the opening O provided with the perpendicular portion P1 to the perimeter of the opening O is greater than 35%, and at least a part of the peripheral surface S is disposed on the side, close to the light-incident surface 121, of the microstructure M.

Figure 6:
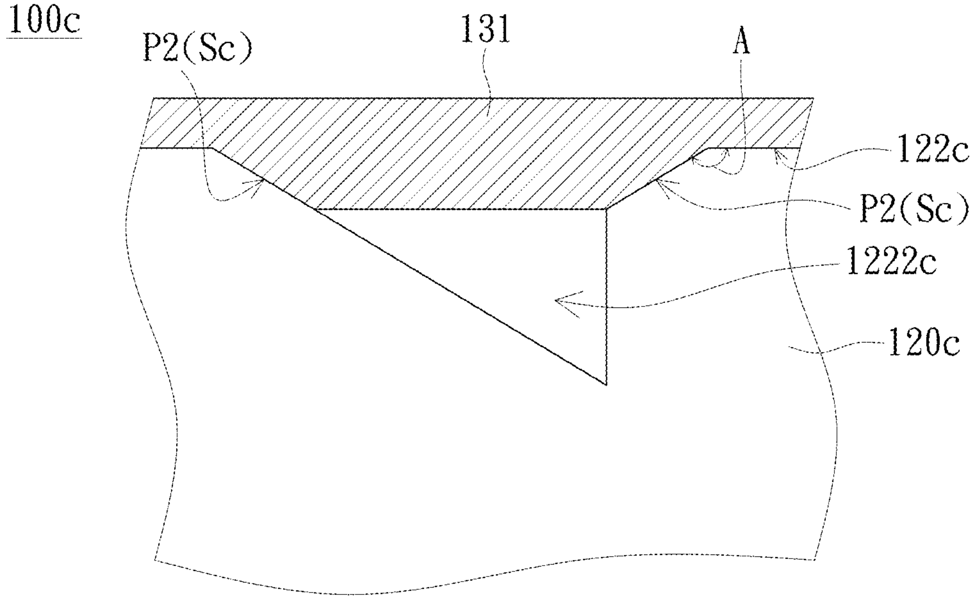
FIG. 6 is an enlarged schematic diagram of a first light-penetrating adhesive layer disposed on a light-exiting surface according to another embodiment of the disclosure.

In another embodiment, for example, in the front light module 100*c* shown in FIG. 6, the peripheral surface Sc of the light guide plate 120*c* has, for example, an inclined portion P2. The inclined portion P2 inclines relative to the light-exiting surface 122*c*, and the inclined portion P2 encircles the opening O, that is, the projection of the inclined portion P2 on the light-exiting surface 122*b* is, for example, a closed annular area. Thus, the area of the light-penetrating adhesive layer 131 in contact with the peripheral surface Sc can be increased, and therefore the amount of the light-penetrating adhesive layer 131 entering the gap section 1222*c* can be reduced. In an embodiment, the slope of the inclined portion P2 relative to the light-exiting surface 122*c* can be approximately less than or equal to 1. In other words, the included angle A between the peripheral surface Sc and the light-exiting surface 122*c* can be approximately greater than or equal to 135°, and the included angle A of the included portion P2 is, for example, a constant value, but the disclosure is not limited thereto. In other embodiments, the inclined portion P2 can only partially encircle the opening O.

Figure 7:
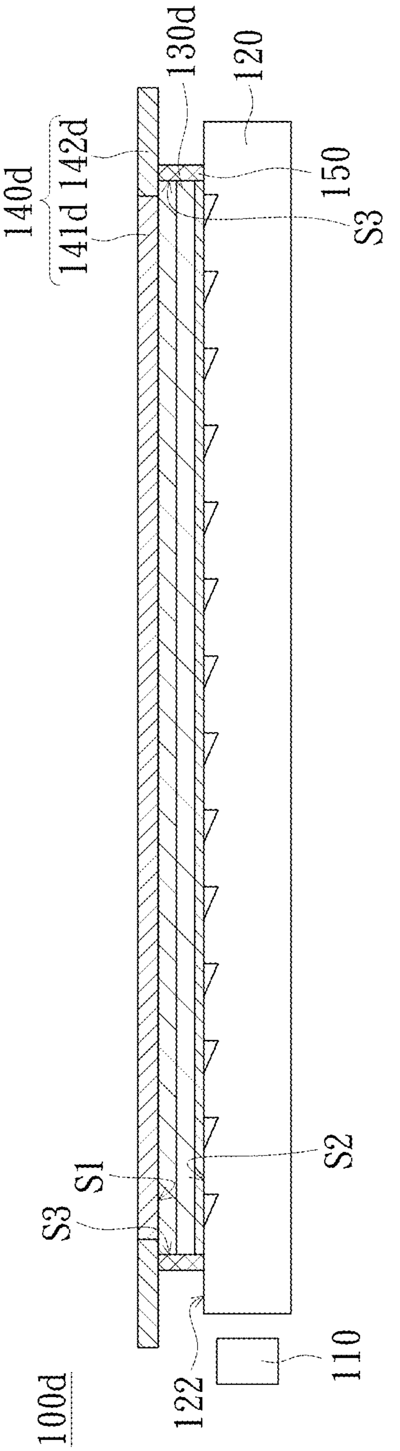
FIG. 7 is a schematic cross-sectional diagram of a front light module in another embodiment of the disclosure.

FIG. 7 is a schematic cross-sectional diagram of a front light module in another embodiment of the disclosure. The structure and advantages of the front light module 100*d* in the embodiment are similar to those in the embodiment shown in FIG. 1, and only the differences will be described below. Referring to FIG. 7, the front light module 100*d* further includes, for example, an adhesive-reinforcement layer 150. The film assembly 130*d* further has a side surface S3, and the side surface S3 is connected to the upper surface S1 and the lower surface S2. The adhesive-reinforcement layer 150 is connected to the light-exiting surface 122 of the light guide plate 120, the cover plate 140*d*, and the side surface S3, so that the film assembly 130*d* is more firmly fixed to the light guide plate 120. Specifically, the film assembly 130*d* exposes, for example, a part of the light-exiting surface 122, and the adhesive-reinforcement layer 150 may be disposed on the side surface S3 and extends to the cover plate 140*d* from the light-exiting surface 122. Further, the cover plate 140*d* may have a light transmission portion 141*d* and a light shading portion 142*d*, where the light shading portion 142*d* encircles the light transmission portion 141*d*, and the adhesive-reinforcement layer 150 can extend to the light shading portion 142*d* from the light-exiting surface 122. In an embodiment, the adhesive-reinforcement layer 150 may be connected to the light-exiting surface 122 and the side surface S3, and whether the adhesive-reinforcement layer 150 extends to the cover plate 140*d* is not limited. Incidentally, in the embodiment, the upper surface S1 and the lower surface S2 may be, for example, parallel to the light-exiting surface 122, respectively. In another embodiment, there can be included angles less than 5° between the upper surface S1 and the light-exiting surface 122 and between the lower surface S2 and the light-exiting surface, respectively. In another embodiment, the adhesive force of the adhesive-reinforcement layer 150 can be greater than the adhesive force of first light-penetrating adhesive layer 131 (or the adhesive force of the second light-penetrating adhesive layer 133).

Figure 8:
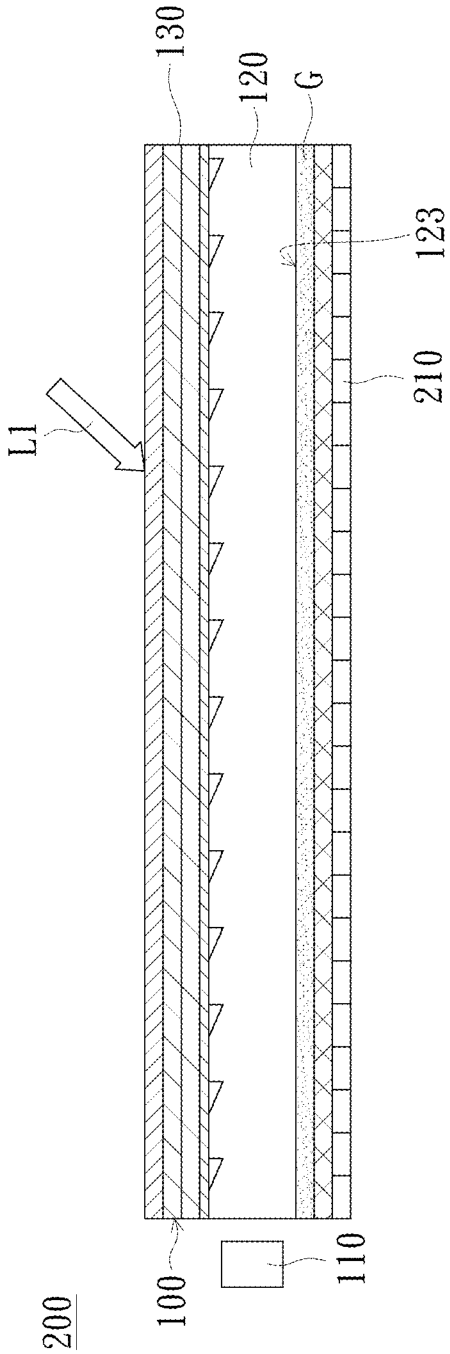
FIG. 8 is a schematic cross-sectional diagram of a display device according to an embodiment of the disclosure.

FIG. 8 is a schematic cross-sectional diagram of a display device according to an embodiment of the disclosure. Referring to FIG. 8, the display device 200 includes a front light module 100 and a reflective display panel 210. The reflective display panel 210 is disposed on a side, opposite to a film assembly 130, of the light guide plate 120. For example, the reflective display panel 210 may be disposed opposite to the surface 123 of the light guide plate 120 and may be fixed to the surface 123 by way of an optical adhesive G. The reflective display panel 210 may selectively include a polarization film (not shown in the figures). The optical adhesive G is, for example, disposed on the polarization film. Specifically, the reflective display panel 210 can reflect the ambient light L1 or the light beam generated by the light-emitting element 110, so as to achieve the effect of displaying an image. As mentioned above, when the ambient light L1 is sufficient, the reflective display panel 210 can display the image by reflecting the ambient light L1. On the contrary, when the ambient light L1 is insufficient, the reflective display panel 210 can display the image by reflecting the light beam generated by the light-emitting element 110. The reflective display panel 210 may include a liquid crystal on silicon (LCOS), which is not limited in the disclosure. In addition, in the embodiment, the reflective display panel 210 may be a monochromatic grayscale display panel or a colored display panel. Further, the display device 200 may include an electronic paper display device, which is not excessively limited in the disclosure.

Compared with the prior art, because the display device 200 in the embodiment is provided with the front light module 100, the visibility can be improved. Incidentally, in other embodiments, the display device 200 may be provided with the front light modules 100*a*, 100*b*, 100*c*, or 100*d*.

To sum up, the front light module provided in the disclosure is provided with the light guide plate and the film assembly. The film assembly is formed by clamping an optical film between the first light-penetrating adhesive layer and the second light-penetrating adhesive layer. Further, the first light-penetrating adhesive layer can fill the gap between the light guide plate and the optical film, to reduce the interfacial reflection formed when the ambient light passes through the optical film and the light-exiting surface. In addition, the second light-penetrating adhesive layer may be disposed on a side, opposite to the light-exiting surface, of the optical film, to fill a gap between the optical film and another optical assembly, so as to further reduce the interfacial reflection formed when the ambient light passes through the second light-penetrating adhesive layer and the optical film. Furthermore, because the second light-penetrating adhesive layer is thicker than the first light-penetrating adhesive layer and the second light-penetrating adhesive layer is located on the side, where the ambient light is incident, of the optical film to replace a conventional air layer, which can reduce interfacial reflection, so that the reflected light formed by the ambient light can further be reduced. Based on the above, the front light module provided in the disclosure can reduce the reflected light on an occasion where the ambient light is extremely intense. Because the display device provided in the disclosure is provided with the front light module, the visibility can be improved on the occasion where the ambient light is extremely intense.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure" is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A front light module, comprising:

a light-emitting element;

a light guide plate, having a light-incident surface and a light-exiting surface, wherein the light-incident surface is connected to the light-exiting surface and is disposed opposite to the light-emitting element, and the light-exiting surface has a plurality of microstructures; and a film assembly, comprising a first light-penetrating adhesive layer, an optical film, and a second light-penetrating adhesive layer, wherein the first light-penetrating adhesive layer is connected to the light-exiting surface, the optical film is disposed between the first light-penetrating adhesive layer and the second light-penetrating adhesive layer, the first light-penetrating adhesive layer is disposed between the light guide plate and the optical film, and a first thickness of the first light-penetrating adhesive layer is less than a second thickness of the second light-penetrating adhesive layer.

2. The front light module according to claim 1, wherein each of the microstructures has an opening and a recessed portion, the opening is located on the light-exiting surface, the recessed portion is recessed in the light-exiting surface and is communicated to the opening, the recessed portion has an adhesive-filling section and a gap section communicated to the adhesive-filling section, the adhesive-filling section is located between the opening and the gap section, and at least a part of the first light-penetrating adhesive layer is disposed in the adhesive-filling sections.

3. The front light module according to claim 1, wherein an adhesive force of the first light-penetrating adhesive layer is smaller than an adhesive force of the second light-penetrating adhesive layer, and the first thickness of the first light-penetrating adhesive layer is less than 50 microns.

4. The front light module according to claim 1, wherein a material of the optical film comprises polyethylene terephthalate, triacetate cellulose, polycarbonate, or polymethyl methacrylate.

5. The front light module according to claim 1, wherein the optical film comprises a polarizer.

6. The front light module according to claim 5, wherein the optical film further comprises an advanced polarization conversion film, and the advanced polarization conversion film is disposed between the first light-penetrating adhesive layer and the polarizer.

7. The front light module according to claim 1, wherein the film assembly has an upper surface and a lower surface, and the upper surface and the lower surface are planes.

8. The front light module according to claim 1, wherein a ratio of a projected area of the first light-penetrating adhesive layer on the light-exiting surface to an area of the light-exiting surface is greater than 0.8.

9. The front light module according to claim 1, further comprising a cover plate and an adhesive-reinforcement layer, wherein the film assembly has an upper surface, a lower surface, and a side surface, the lower surface is connected to the light-exiting surface of the light guide plate, the upper surface is connected to the cover plate, the side surface is connected to the lower surface and the upper surface, and the adhesive-reinforcement layer is connected to the light-exiting surface of the light guide plate, the cover plate, and the side surface.

10. A display device, comprising:

a front light module, comprising a light-emitting element, a light guide plate, and a film assembly, wherein the light guide plate has a light-incident surface and a light-exiting surface, the light-incident surface is connected to the light-exiting surface and is disposed opposite to the light-emitting element, the light-exiting surface has a plurality of microstructures, the film assembly comprises a first light-penetrating adhesive layer, an optical film, and a second light-penetrating adhesive layer, the first light-penetrating adhesive layer is connected to the light-exiting surface, the optical film is disposed between the first light-penetrating adhesive layer and the second light-penetrating adhesive layer, and the first light-penetrating adhesive layer is disposed between the light guide plate and the optical film, and wherein a first thickness of the first light-penetrating adhesive layer is less than a second thickness of the second light-penetrating adhesive layer; and a reflective display panel, disposed on a side, opposite to the film assembly, of the light guide plate.

* * * * *